3,076,792
LUBRICATING OIL ADDITIVES OBTAINED BY SHEARING A POLYMER AND A MONOMER
William C. Hollyday, Jr., Plainfield, and Monroe W. Munsell, Berkeley Heights, N.J., assignors to Esso Research and Engineering Company, a corporation of Delaware
No Drawing. Filed Sept. 1, 1960, Ser. No. 53,349
9 Claims. (Cl. 260—78.5)

This invention relates to a method of preparing new materials from polymers which comprises subjecting said polymers to shear in the presence of reactive monomers. It relates also to the products so produced and their uses. More particularly, this invention relates to lubricating oil additives.

It has been recognized by the art that polymers may be subjected to a high shear rate in the presence of various monomers in such a manner that a free radical reaction is initiated. At the conclusion of the free radical-initiated process a new polymer is obtained which comprises the reaction product of the reactant polymer and the monomer.

It is known that organic polymers of high molecular weight prepared from unsaturated organic monomers such as homopolymers of esters of acrylic and methacrylic acids, isobutylene, ethylene, propylene, etc. are useful for improving various properties of a lubricating oil. The properties involved may be pour point, viscosity index, and the like. Certain copolymers, such as those of alkyl fumarates and vinyl acetate, are also useful for similar purposes. However, these copolymers and homopolymers are generally specific for improving one particular property in a lubricating oil. It is desired to modify them in such a manner that they improve additional properties in lubricating oils.

It has now been discovered that when certain organic polymers are sheared in the presence of a nitrogen-containing polymerizable monomer, a new type additive material is obtained. Since this new material is structurally similar to commercially available dispersant polymers, it should improve the sludge handling ability of a lubricating oil. Additionally, a specific amount of the new additive improves the viscosity index of a lubricating oil to the same extent as a larger amount of commercial viscosity index improver.

Besides the advantages of detergency and higher viscosity index, a very important achievement is realized in the realm of shear stability and thickening power. Resistance to shear degradation is important because a loss in viscosity due to breakdown in service means an increase in oil consumption. Shear stability is mostly a function of molecular weight of the additive. Low molecular weight polymers in general are the most shear stable, but are also most expensive to use because they thicken less, requiring higher concentrations to reach a target blend viscosity. A major feature of the instant invention is the discovery that the sheared polymers are lube oil additives having a relatively high thickening power coupled with a high shear stability. With these additives it is possible to obtain certain target viscosities of a lube oil using less additive than would be needed if a commercial product were used. The measure of shear stability is usually expressed in terms of relative shear breakdown (RSB). RSB is the figure obtained when the viscosity loss of the oil blend after running in a standard test engine, usually the McIntyre pump, is divided by the initial viscosity increase in the base oil caused by the additive polymer. Thus, shear stability becomes greater as the RSB value decreases.

Generally from 0.05 to 2.0, e.g., 0.2 to 1.2 molar proportions of monomer per molar proportion of polymer are sheared together. The polymer and monomer can be either liquid or solid at room temperature. If desired, the monomer and polymer reactants can be sheared in the presence of a suitable solvent such as a solvent neutral mineral oil. The products formed in the reaction may be recovered by any suitable means of separation such as filtration, solvent extraction, dehydration, distillation, and the like. The useful polymeric products are not volatile, but unreacted material or excess solvent may be distilled off. Preferably the whole reaction mass is used as is without any separation.

Polymers suitable for use in the invention may be a homopolymer, that is, a polymer consisting of a single constituent monomer, or it may be a copolymer consisting of two or more constituent monomers. These polymers may be prepared by conventional polymerization or copolymerization techniques well known in the art. The preparation of such polymeric materials does not constitute part of this invention.

The polymers useful in the method of the invention include oil soluble homopolymers and copolymers formed from $C_2$ to $C_{30}$ olefins and $C_4$ to $C_{30}$ unsaturated esters. The homopolymers are exemplified by the following:

Polymers of monoolefins which may be aliphatic or have an aromatic substituent, e.g., ethylene, propylene, isobutylene, alkyl styrene, etc.

Polymers of diolefins, e.g., butadiene, isoprene, etc.

Polymers of esters of acrylic and of methacrylic acids, e.g., decyl acrylate, lauryl methacrylate, mixed $C_8$ to $C_{18}$ methacrylates, etc.

Polymers of vinyl esters, e.g., vinyl 2-ethylhexoate, the vinyl ester of coconut acids, the vinyl ester of $C_{10}$ oxo acids made by the oxonation of tripropylene, etc.

Polymers of vinyl ethers, e.g., vinyl isobutyl ether, vinyl decyl ether, the vinyl ether of $C_8$ oxo alcohol made by the oxonation of $C_7$ monoolefin (propylene-butylene copolymer), etc.

Polymers of esters of $\alpha,\beta$-unsaturated dicarboxylic acids, e.g., octyl fumarate, lauryl maleate, the aconitate and itaconate esters of mixed alcohols obtained by the hydrogenation of coconut oil acids, etc.

The copolymers are exemplified by the following:

Copolymers of various olefins, e.g., ethylene and propylene; isobutylene and styrene; butadiene and isobutylene; butadiene and methyl styrene; etc.

Copolymers of olefins and unsaturated esters, e.g., isobutylene and ethyl fumarate; octadecene and lauryl maleate; styrene and tetradecyl fumarate, etc.

Copolymers of various esters of unsaturated acids, e.g., ethyl methacrylate and octyl fumarate; methyl acrylate and dodecyl maleate; octadecyl fumarate and octyl aconitate; methyl methacrylate and stearyl itaconate; isopropenyl acetate and tetradecyl acrylate, etc.

Copolymers of vinyl esters and unsaturated acid esters, e.g., vinyl acetate and fumarate esters of tallow alcohols; vinyl 2-ethyl butyrate and isodecyl maleate; isopropenyl acetate and the itaconic esters of coconut alcohols; etc.

The preferred polymers to be subjected to the process of the invention are oil soluble homopolymers and copolymers formed from $C_4$ to $C_{26}$ unsaturated esters and from $C_2$ to $C_{15}$, e.g., $C_2$ to $C_{10}$, olefins. The unsaturated esters are (1) methacrylates and acrylates formed from methacrylic acid and acrylic acid and $C_4$ to $C_{20}$, e.g., $C_5$ to $C_{15}$, aliphatic alcohols, (2) vinyl esters formed from acetylene and $C_2$ to $C_{18}$, e.g., $C_2$ to $C_6$, carboxylic acids, and (3) $\alpha,\beta$-unsaturated carboxylic acid esters formed from $C_3$ to $C_6$ $\alpha,\beta$-unsaturated dicarboxylic acids and $C_3$ to $C_{20}$, e.g., $C_{12}$ to $C_{18}$ aliphatic alcohols. The olefins are monoolefins and diolefins which may be aliphatic or have an aromatic substituent. The polymers and copolymers of methacrylates and acrylates and the copolymers of vinyl esters and unsaturated carboxylic acid esters are particularly preferred. Examples of these polymers have already been given.

The molecular weight of the polymers should be sufficiently high to permit a degradation of the polymer molecule when the polymer is subjected to the shearing treatment. The molecular weight of the polymers used in the process of the invention will, therefore, vary over a considerable range depending on the ease with which the individual polymer may be degraded, the intensity of the shearing, etc. Polymers having intrinsic viscosities as low as 0.3 can be used in the process. Intrinsic viscosity is a measure of molecular weight and the method of determining it has been well described in the literature as, for instance, Paul J. Flory, Principles of Polymer Chemistry (Cornell University Press, Ithaca, N.Y., 1953), pp. 308–312. In other cases, polymers having an intrinsic viscosity as high as or higher than 3.0 can be used. The preferred molecular weights of the polymers to be used in the process are such that the intrinsic viscosities are 0.75 to 2.0.

The polymerizable nitrogen containing monomers of the present invention are derived from N-vinylbutyrolactam. The N-vinylbutyrolactam used is represented by the general formula:

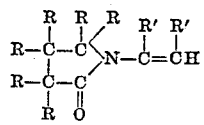

wherein R and R′ may be hydrogen or a $C_1-C_{12}$ alkyl group. The preferred compound is N-vinyl-α-pyrrolidone, i.e., wherein both R and R′ in the general formula described above are hydrogen.

N-vinyl-α-pyrrolidone is relatively easily obtained from α-butyrolactone by reaction with ammonia at elevated temperatures, a mixture of the pyrrolidone thus obtained with potassium hydroxide being vinylated with acetylene at elevated pressures. The α-butyrolactone can be a by-product from wood carbonization.

The shear stress may be applied by any suitable means. The degradation of the polymer is preferably accomplished by passing the reaction mixture through variously designed throttle valves or narrow orifices at high linear velocity.

The amount of shear stress to be applied to the reaction mixture will vary over a considerable range depending upon the type of polymer to be broken down, e.g., whether it contains —C—C—, —C—O—, etc., bonds, the molecular weight of the polymer, the viscosity of the polymer and monomer mixture, etc., but it should be at least sufficient to effect a degradation of the polymer and preferably sufficient to reduce the intrinsic viscosity of the polymer at least 25%.

The rate of shear is preferably above 1,000 reciprocal seconds, and still more preferably is between $10^4$ and $10^6$ reciprocal seconds.

The process of the invention may be executed in any convenient type apparatus enabling the maintenance of the proper conditions and the introduction of the various reactants. The process may be carried out in batch, semi-continuous or continuous manner. For large-scale production it is preferred to conduct the process in a continuous manner.

The term "shearing" is intended to include any method of subjecting the polymers and monomers to shearing forces, that is, the application of force in a plane. Examples of apparatus suitable for such purposes are: the Charlotte colloid mill, the Gaulin homogenizers made and sold by the Manton-Gaulin Manufacturing Company, the Morehouse mill made by Morehouse Industries, and other similar apparatus suitable for the purpose.

In order to more specifically illustrate the process of this invention the following example is given. It is illustrative only and is not considered to be limiting in any way upon the concept of this invention.

EXAMPLE I

A mixture of 40 grams of a methacrylate polymer, which has a average alkyl side chain of about 10 carbon atoms, said side chain being derived from approximately equal molar portions of $C_4$, $C_8$, $C_{12}$ and $C_{18}$ alkanols, an intrinsic viscosity of about 0.88 and a relative shear breakdown of 65, and 2.2 grams of N-vinyl-α-pyrrolidone in 760 grams of a neutral distillate solvent of 150 SUS at 100° F. viscosity was circulated through a Manton-Gaulin homogenizer for about 15 minutes. This is equivalent to about 30 passes through the shearing orifice and pressure plates. The pressure was maintained at 5,000 lbs. per sq. in. The temperature rose from 150° F. at the start of the circulation to 260° F. at the end. The shearing rate was about $3 \times 10^5$ reciprocal seconds. The product was stripped by blowing with inert gas to remove unreacted N-vinyl α-pyrrolidone from the mixture. Kjeldahl analysis of the product showed that about half of the nitrogen originally present had become fixed and non-volatile as a result of the shearing. The product was not removed from the neutral distillate but the solution was used to make blends for testing.

In order to test the product of the shear treatment for V.I. improving properties, and thickening ability with relation to shear stability, several blends of lubricating oil containing the product were prepared. These blends were compared with lubricating oil blends containing commercial additives.

Blends A and B were prepared from a neutral distillate having a viscosity index of 109. It was found that in order to obtain a V.I. of 143 and a viscosity in centistokes of approximately 96 at 100° F. and approximately 16 at 210° F., 5.00 wt. percent of the sheared product (blend A) was needed as compared with 5.82 wt. percent of a commercial methacrylate polymer (blend B). This commercial polymer was the same chemically as the original polymer reactant in the shear treatment, but had a lower molecular weight.

Blends C and D were prepared from a base stock containing 98% solvent neutral and 2% bright stock and having a viscosity of 9.21 cs. at 210° F. and a V.I. of 95. To prepare blend C, sufficient sheared product was added to one portion of the base stock to obtain an oil blend having a viscosity of 14.76 cs. at 210° F. To prepare blend D, sufficient commercial methacrylate polymer similar chemically to the original unsheared polymer but of lower molecular weight was added to an identical volume of the base stock portion to obtain the same viscosity as blend C. The wt. percent of sheared product to achieve this result was 1.68 as compared with 1.82 of the commercial polymer. The polymers used in blends C and D had the same relative shear breakdown, as the comparison would not be meaningful unless both polymers had the same relative shear breakdown value. The sheared polymer is subjected to additional homogenization until the desired RSB figure is obtained which is 37 for blends C and D.

Blends E and F were prepared from two equal portions of the same base stock as used for blends C and D. Blend E is obtained by adding to one of such portions 2.16 wt. percent of a sheared additive similar to the material used for blend C except that additional homogenization has reduced its RSB to 15. This quantity of polymer is sufficient to change the viscosity from 9.21 cs. at 210° F. to 14.76 cs. at 210° F. Blend F is obtained by adding to the other portion of the base stock 2.51 wt. percent of a commercial additive which also has a RSB of 15 and is similar chemically to the unsheared polymer except it has a lower molecular weight, to give the same viscosity specification.

The standard breakdown test used in all the materials described in the example is the standard McIntyre pump test. In this test the blends to be tested are forced through an orifice by a gear pump. Blends containing a polymer lose viscosity because of the shear breakdown of the polymer which, in effect, is a decrease in the molecular weight of the polymer. Conditions of temperature, pressure and pumping rate are maintained at a constant so that relative values are obtained, and the exact conditions need not be described.

Shear stability is a function or specific property of a given polymer, and is essentially independent of the type of base oil comprising the blend and the amount of polymer in the blend. The actual amount of breakdown depends upon the apparatus and conditions, but the relative values thus obtained for different polymers are in a given proportion and may be converted from one type of test to another.

The results of the above tests are summarized in the following table.

Table I.—Properties of Methacrylate Polymer/N-Vinyl Pyrrolidone Mixture Subjected to Shear

1. V.I. IMPROVER PROPERTIES

| Methacrylate Polymer | Wt. Percent Polymer | Properties of Blends in Solvent 150 Neutral | | |
|---|---|---|---|---|
| | | Cs./100° F. | Cs./210° F. | V.I. |
| (None) | 0.00 | 32.46 | 5.17 | 96 |
| A. Experimental, sheared | 5.00 | 96.15 | 15.97 | 143 |
| B. Commercial | 5.82 | 95.70 | 15.95 | 143 |

2. RELATIVE REQUIREMENTS AND SHEAR STABILITY

| Methacrylate Polymer | Wt. percent for Oil Blend [1] | Relative Polymer Requirement | Relative Shear Breakdown [2] | Advantage for Shearing over Direct Polymerization, percent Polymer Saved [3] |
|---|---|---|---|---|
| C. Exper., sheared | 1.68 | 1.00 | 37 | 7.4 |
| D. Commercial | 1.82 | 1.08 | 37 | |
| E. Exper., sheared | 2.16 | 1.28 | 15 | 14.0 |
| F. Commercial | 2.51 | 1.49 | 15 | |

[1] Polymer required to thicken 95 V.I. base stock of 9.21 cs. to 14.76 cs. at 210° F.
[2] Standard McIntyre pump breakdown test values as percent viscosity lost.
[3] Comparisons are applicable only at same breakdown values.

It will be noted that the commercial V.I. improvers have been matched in V.I. improver properties very closely by the sheared additive. An important difference is that less of the sheared polymer is needed to prepare an oil of a given viscosity, V.I. and shear stability from a given base stock. This difference is especially important and relatively greater in the highly shear stable (low shear breakdown) materials.

For example, as seen in the table, it requires 14% less polymer in blend E than polymer in blend F to make up an oil blend of the same viscosity and shear breakdown from a given base stock. A further advantage is that the polymer of blend E is of the sludge dispersant type containing nitrogen, while blend F containing the commercial polymer is not. If a polymer similar to that in blend F but containing nitrogen were made by direct polymerization it is likely that the difference in requirements between this and the polymer in blend E would be even more than 14%. Polymers similar to that in blend E but containing nitrogen are not commercially available, which probably indicates that they would be uneconomical.

EXAMPLE II

To further illustrate the invention, the shearing treatment of Example I may be repeated exactly except that a copolymer of vinyl acetate and a mixture of di-tallow ($C_{16}$–$C_{18}$) fumarate and di-$C_8$ Oxo fumarate is used in place of the methacrylate polymer and there is a shorter homogenization time. The fumarate mixture has an average chain length of just under 10 carbon atoms. The copolymer contains about one mole of vinyl acetate per mole of fumarate. The intrinsic viscosity of the copolymer is about 1.27.

The copolymer was prepared from the following parts by weight:

18.7 of di-tallow ($C_{16}$–$C_{18}$) fumarate which is prepared by reacting tallow alcohols which are a mixture of $C_{16}$ and $C_{18}$ alkanols with fumaric acid 49.4 of di-$C_8$ Oxo fumarate which is prepared by reacting Oxo alcohols with fumaric acid. Oxo alcohols are prepared from olefins which are reacted with carbon monoxide and hydrogen to form aldehydes. The aldehydes are hydrogenated to form very highly branched alcohols.

31.9 of vinyl acetate

The excess (unreacted) vinyl acetate was removed after the above mixture had been polymerized with benzoyl peroxide catalyst with a yield of about 81 parts copolymer, which has a relative shear breakdown of 71 prior to shearing.

40 g. of the copolymer and 2 g. of N-vinyl-α-pyridine dissolved in 760 g. of solvent 150 neutral were homogenized exactly as in the previous example. The resulting product was then further homogenized until it had a relative shear breakdown of 21.

A similar terpolymer with a relative shear breakdown of 21 can be made by direct terpolymerization but the direct copolymer is lower in molecular weight so that more polymer is required to make an oil blend with the same viscosity (as compared with the homogenized polymer).

In order to test the product of the shearing treatment of Example II, for V.I. improving properties and thickening ability with relation to shear stability, several blends of lubricating oil containing the product were prepared. These blends were compared with other lubricating oil blends containing polymers of a similar chemical composition but differing in that they were prepared by direct polymerization.

Blend G was prepared from a neutral distillate having an initial viscosity index of 96 to which 5.0 wt. percent of the sheared product was added. This quantity of polymer was sufficient to raise the viscosity index of the blend to 142. As shown in Example I, blend B, 5.82 wt. percent of a commercial polymer is needed to raise the V.I. to 143.

Blends H, I and J were prepared from three equal portions of a neutral distillate having an initial viscosity of 5.96 cs. at 210° F. to which 3.6 wt. percent of three terpolymers of fumarate ester, vinyl acetate and N-vinyl-α-pyrrolidone was added. The terpolymers were of different molecular weights as indicated by the viscosity in centistokes at 210° F. of each of the three blends, i.e., 15.96 for blend H, 13.62 for blend I and 12.50 for blend J. The viscosity of the oil blends will vary proportionately to the molecular weights of the terpolymers. Blend K was prepared in the same manner as the H, I and J blends except with 3.6 wt. percent of the same experimental polymer used above in blend G, and had a viscosity of 13.96 cs. at 210° F. Although blend H has the highest viscosity, it also has a high relative shear breakdown, i.e., 40. Blend I not only has a lower viscosity, but also a fairly high relative shear breakdown, i.e., 33. Blends J and K have the same low relative shear breakdown, i.e., 21 but blend J has a lower viscosity. Thus, it is observed that the sheared product of Example II combines a low relative shear breakdown with the ability to thicken an oil to a greater extent than the same type of commercial polymer. This feature was additionally demonstrated by the comparison wherein two oil samples having an initial viscosity of 46 SUS at 210° F, were blended to a viscosity of 68 SUS at 210° F. In order to reach the 68 SUS viscosity, 4.25 wt. percent of the terpolymer of blend G is needed while only 3.65 wt. percent of the sheared product of Example II is needed. This represents a 14% saving in the amount of polymer needed to achieve the target viscosity of 68 SUS at 210° F. The results of these tests and comparisons are shown in Table II which follows.

Table II.— *Properties of Copolymer and N-Vinyl Pyrrolidone Mixture Subjected to Shear*

1. V.I. IMPROVER PROPERTIES

| Polymeric Material | Wt. percent Polymer | Properties of Blend in Solvent 150 Neutral | | |
|---|---|---|---|---|
| | | Cs./100° F. | Cs./210° F. | V.I. |
| (None) | 0.00 | 32.46 | 5.17 | 96 |
| G. Exper. Sheared [1] | 5.00 | 104.20 | 16.90 | 142 |

2. SHEAR STABILITY PROPERTIES

| Polymeric Material | Wt. Percent Polymer | Oil Blend, Cs./210° F. | Relative Shear Breakdown[3] |
|---|---|---|---|
| (None) | 0.0 | 5.96 | |
| H. Terpolymer [2] | 3.6 | 15.96 | 40 |
| I. Terpolymer [2] | 3.6 | 13.62 | 33 |
| J. Terpolymer [2] | 3.6 | 12.50 | 21 |
| K. Exper. Sheared [1] | 3.6 | 13.96 | 21 |

3. RELATIVE REQUIREMENTS

| Polymeric Material | Wt. Percent Polymer | Relative Polymer Requirement | Relative Shear Breakdown[3] | Oil Blend SUS/210° F. | Percent Polymer Saved |
|---|---|---|---|---|---|
| (None) | 0.00 | | | 46 | |
| J. Terpolymer [2] | 4.25 | 1.11 | 21 | 68 | |
| K. Exper. Sheared [1] | 3.65 | 1.00 | 21 | 68 | 14 |

[1] Fumarate/vinyl acetate copolymer sheared in the presence of N-vinyl-α-pyrrolidone.
[2] Fumarate/vinyl acetate/N-vinyl-α-pyrrolidone terpolymer made by direct copolymerization, but of different molecular weights.
[3] Standard breakdown test, relative values as percent viscosity lost.

EXAMPLE III

To further illustrate the invention the shearing process of Example I is repeated exactly except that polyisobutylene having an intrinsic viscosity of about 1.0 is used in place of the methacrylate polymer.

EXAMPLE IV

To additionally illustrate the invention, Example I is repeated exactly except the polymer is a copolymer of a $C_{13}$ acrylate ester and a $C_{14}$ methacrylate ester.

In summary, the invention relates to polymeric materials prepared by subjecting polymers prepared from monomers selected from the group consisting of $C_4$ to $C_{30}$ unsaturated esters, $C_2$ to $C_{30}$ olefins and mixtures thereof to shear in the presence of N-vinylbutyrolactams. The polymeric materials obtained from the shearing are useful oil additives.

What is claimed is:

1. A method of preparing a polymeric material useful as an oil additive comprising subjecting one molar proportion of a polymer having an intrinsic viscosity of 0.3 to 3.0 prepared from monomers selected from the group consisting of $C_4$ to $C_{30}$ unsaturated esters, $C_2$ to $C_{30}$ olefins and mixtures thereof, and 0.05 to 2.0 molar proportions of an N-vinylbutyrolactam represented by the formula:

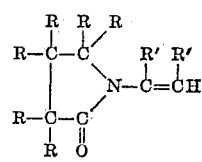

wherein R and R' are selected from the group consisting of hydrogen and $C_1$–$C_{12}$ alkyl radicals, to shearing at above 1,000 reciprocal seconds of shear for a time sufficient to effect a degradation of said polymer such that the viscosity of the sheared polymer exceeds that of an unsheared polymer of the same relative shear breakdown number, said unsheared polymer having the same chemical composition as, but a lower molecular weight than, the sheared polymer prior to shearing.

2. A polymeric material useful as an oil additive prepared by the method of claim 1.

3. A material according to claim 2 wherein said polymer is the copolymer of a $C_4$ to $C_{20}$ vinyl ester and a $C_7$ to $C_{24}$ alkyl fumarate.

4. A material according to claim 2 wherein said polymer is that formed by polymerizing $C_9$ to $C_{24}$ alkyl esters of methacrylic acid.

5. A material according to claim 2 wherein said polymer is that formed by polymerizing $C_8$ to $C_{23}$ alkyl esters of acrylic acid.

6. A material according to claim 2 wherein said polymer is that formed by copolymerizing $C_5$ to $C_{24}$ alkyl esters of methacrylic acid with $C_4$ to $C_{23}$ alkyl esters of acrylic acid.

7. A material according to claim 2 wherein said polymer is that formed by polymerizing $C_2$ to $C_{10}$ olefins.

8. A process for producing new lubricating oil additives which comprises subjecting one molar proportion of a polymeric material having an intrinsic viscosity of from 0.75 to 2.0 and formed from $C_9$ to $C_{19}$ methacrylic esters and 0.2 to 1.2 molar proportions of an N-vinylbutyrolactam represented by the formula:

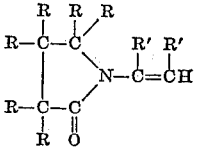

wherein R and R' are selected from the group consisting of hydrogen and $C_1$–$C_{12}$ alkyl radicals to 10,000 to 1,000,000 reciprocal seconds of shear for a time sufficient to effect a degradation of said polymer such that the viscosity of the sheared polymer exceeds that of an unsheared polymer of the same relative shear breakdown number, said unsheared polymer having the same chemical composition as, but a lower molecular weight than, the sheared polymer prior to shearing.

9. A method of preparing a polymeric material useful as an oil additive comprising subjecting one molar proportion of a polymer having an intrinsic viscosity of 0.75 to 2.0 prepared from monomers selected from the group consisting of $C_4$ to $C_{26}$ unsaturated esters, $C_2$ to $C_{30}$ olefins and mixtures thereof, and 0.2 to 1.2 molar proportions of N-vinyl-α-pyrrolidone to 10,000 to 1,000,000 reciprocal seconds of shear for a time sufficient to effect a degradation of said polymer such that the viscosity of the sheared polymer exceeds that of an unsheared polymer of the same relative shear breakdown number, said unsheared polymer having the same chemical composition as, but a lower molecular weight than, the sheared polymer prior to shearing.

References Cited in the file of this patent

UNITED STATES PATENTS

| | | |
|---|---|---|
| 2,852,565 | Nozaki | Sept. 16, 1958 |
| 2,876,213 | Bartlett | Mar. 3, 1959 |

OTHER REFERENCES

Jellinek: Degradation of Vinyl Polymers, pub. 1955, Academic Press Publishers, New York, N.Y., pages 314 and 315.